US011733965B2

(12) United States Patent
Heo et al.

(10) Patent No.: US 11,733,965 B2
(45) Date of Patent: Aug. 22, 2023

(54) DISPLAY DEVICE AND OPERATING METHOD THEREOF

(71) Applicant: LG ELECTRONICS INC., Seoul (KR)

(72) Inventors: Seunghyun Heo, Seoul (KR); Kiwon Park, Seoul (KR); Daegun Park, Seoul (KR); Sangseok Lee, Seoul (KR); Yookyoung Choi, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/971,301

(22) PCT Filed: Mar. 29, 2018

(86) PCT No.: PCT/KR2018/003685
§ 371 (c)(1),
(2) Date: Aug. 19, 2020

(87) PCT Pub. No.: WO2019/164049
PCT Pub. Date: Aug. 29, 2019

(65) Prior Publication Data
US 2020/0401371 A1 Dec. 24, 2020

(30) Foreign Application Priority Data
Feb. 21, 2018 (KR) .................. 10-2018-0020420

(51) Int. Cl.
*G06F 3/16* (2006.01)
*H04N 21/422* (2011.01)
(Continued)

(52) U.S. Cl.
CPC .............. *G06F 3/167* (2013.01); *G10L 13/00* (2013.01); *G10L 15/1815* (2013.01);
(Continued)

(58) Field of Classification Search
CPC .. G06F 3/167; G06N 20/00; H04N 21/42203; H04N 21/42222; H04N 21/4394;
(Continued)

(56) References Cited

U.S. PATENT DOCUMENTS

2008/0103780 A1 5/2008 DaCosta
2012/0042343 A1* 2/2012 Laligand ........ H04N 21/234336
725/53

(Continued)

FOREIGN PATENT DOCUMENTS

EP 2713366 4/2014
JP 2016095383 5/2016
(Continued)

OTHER PUBLICATIONS

PCT International Application No. PCT/KR2018/003685, International Search Report dated Nov. 16, 2018, 2 pages.

(Continued)

*Primary Examiner* — Rong Le
(74) *Attorney, Agent, or Firm* — Lee, Hong, Degerman, Kang & Waimey PC

(57) ABSTRACT

Provided are a display device for more accurately providing a function intended by a user upon reception of the voice command and an operating method thereof. The display device comprises a wireless communication unit configured to communicate with at least one external server, a storage unit, a voice recognition unit configured to receive a voice command, a control unit configured to acquire a function corresponding to the voice command, a determination module configured to determine a provider providing the function corresponding to the voice command and an output unit configured to receive data related to the function from the at least one external server or the storage unit according to the
(Continued)

determined provider and output the function corresponding to the voice command based on the received data.

5 Claims, 16 Drawing Sheets

(51) Int. Cl.
| | |
|---|---|
| *H04N 21/643* | (2011.01) |
| *H04N 21/439* | (2011.01) |
| *H04N 21/4415* | (2011.01) |
| *G10L 15/22* | (2006.01) |
| *G10L 15/30* | (2013.01) |
| *G10L 13/00* | (2006.01) |
| *G10L 15/18* | (2013.01) |
| *G06N 20/00* | (2019.01) |

(52) U.S. Cl.
CPC ............ *G10L 15/22* (2013.01); *G10L 15/30* (2013.01); *H04N 21/42203* (2013.01); *H04N 21/42222* (2013.01); *H04N 21/4394* (2013.01); *H04N 21/4415* (2013.01); *H04N 21/64322* (2013.01); *G06N 20/00* (2019.01); *G10L 2015/223* (2013.01)

(58) Field of Classification Search
CPC ....... H04N 21/440236; H04N 21/4415; H04N 21/472; H04N 21/47815; H04N 21/64322; G10L 13/00; G10L 15/1815; G10L 15/22; G10L 15/26; G10L 15/30; G10L 2015/223
See application file for complete search history.

(56) References Cited

U.S. PATENT DOCUMENTS

| | | | |
|---|---|---|---|
| 2014/0012585 A1* | 1/2014 | Heo | H04N 21/2393 |
| | | | 704/270.1 |
| 2014/0089446 A1 | 3/2014 | Mallikarjunan et al. | |
| 2014/0092007 A1 | 4/2014 | Kim et al. | |
| 2015/0134333 A1* | 5/2015 | Sim | G10L 15/22 |
| | | | 704/246 |
| 2017/0256260 A1 | 9/2017 | Jeong | |
| 2018/0286421 A1* | 10/2018 | Yu | H04N 21/8405 |
| 2019/0035398 A1 | 1/2019 | Choi et al. | |
| 2019/0124388 A1* | 4/2019 | Schwartz | H04N 21/42203 |
| 2021/0056969 A1* | 2/2021 | Yun | H04N 21/482 |
| 2021/0319211 A1* | 10/2021 | Tong | G08B 21/18 |
| 2022/0084160 A1* | 3/2022 | Yoshizawa | G06T 1/20 |

FOREIGN PATENT DOCUMENTS

| | | |
|---|---|---|
| KR | 1020140004515 | 1/2014 |
| KR | 20150054490 | 5/2015 |
| KR | 1020170051994 | 5/2017 |
| KR | 1020170093629 | 8/2017 |

OTHER PUBLICATIONS

European Patent Office Application Serial No. 18907162.4, Search Report dated Oct. 20, 2021, 8 pages.
Korean Intellectual Property Office Application No. 10-2018-0020420, Office Action dated Jul. 26, 2022, 6 pages.
Korean Intellectual Property Office Application No. 10-2018-0020420, Notice of Allowance dated Jun. 12, 2023, 8 pages.

* cited by examiner

[Figure 1]
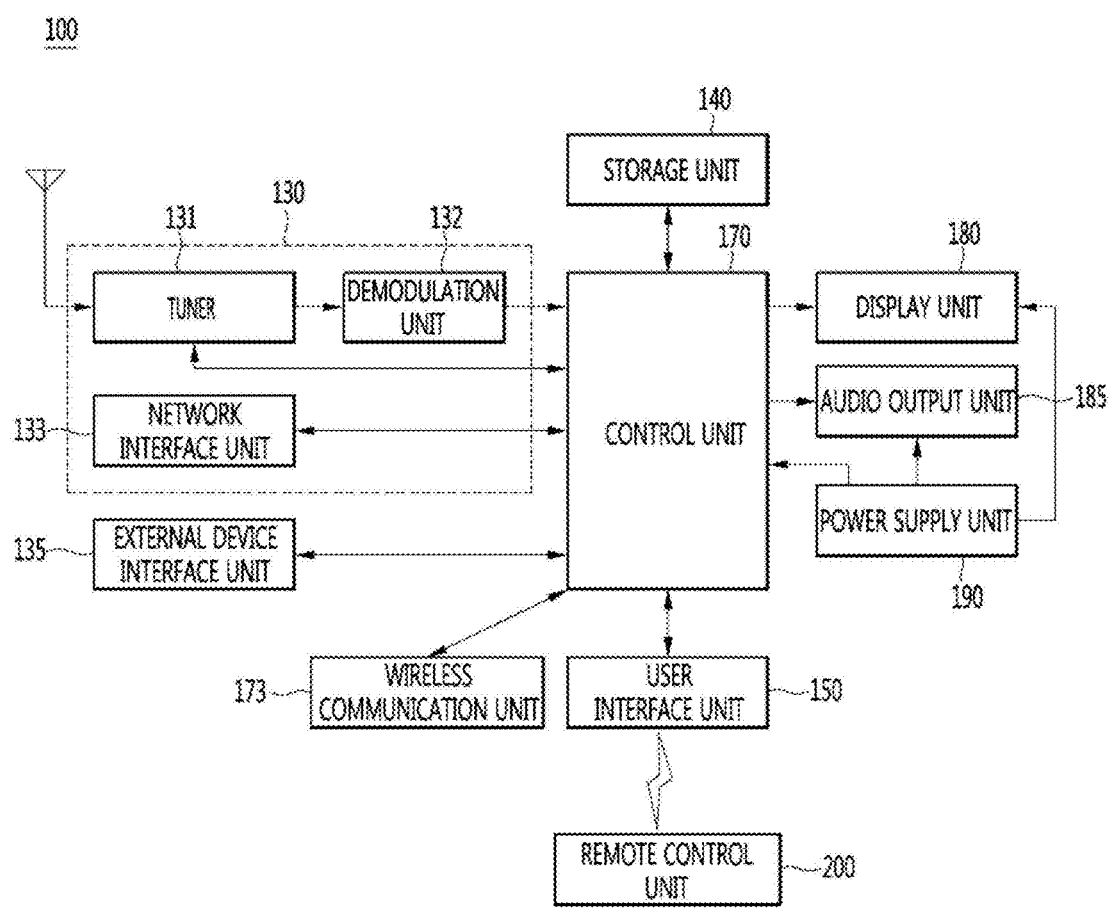

【Figure 2】
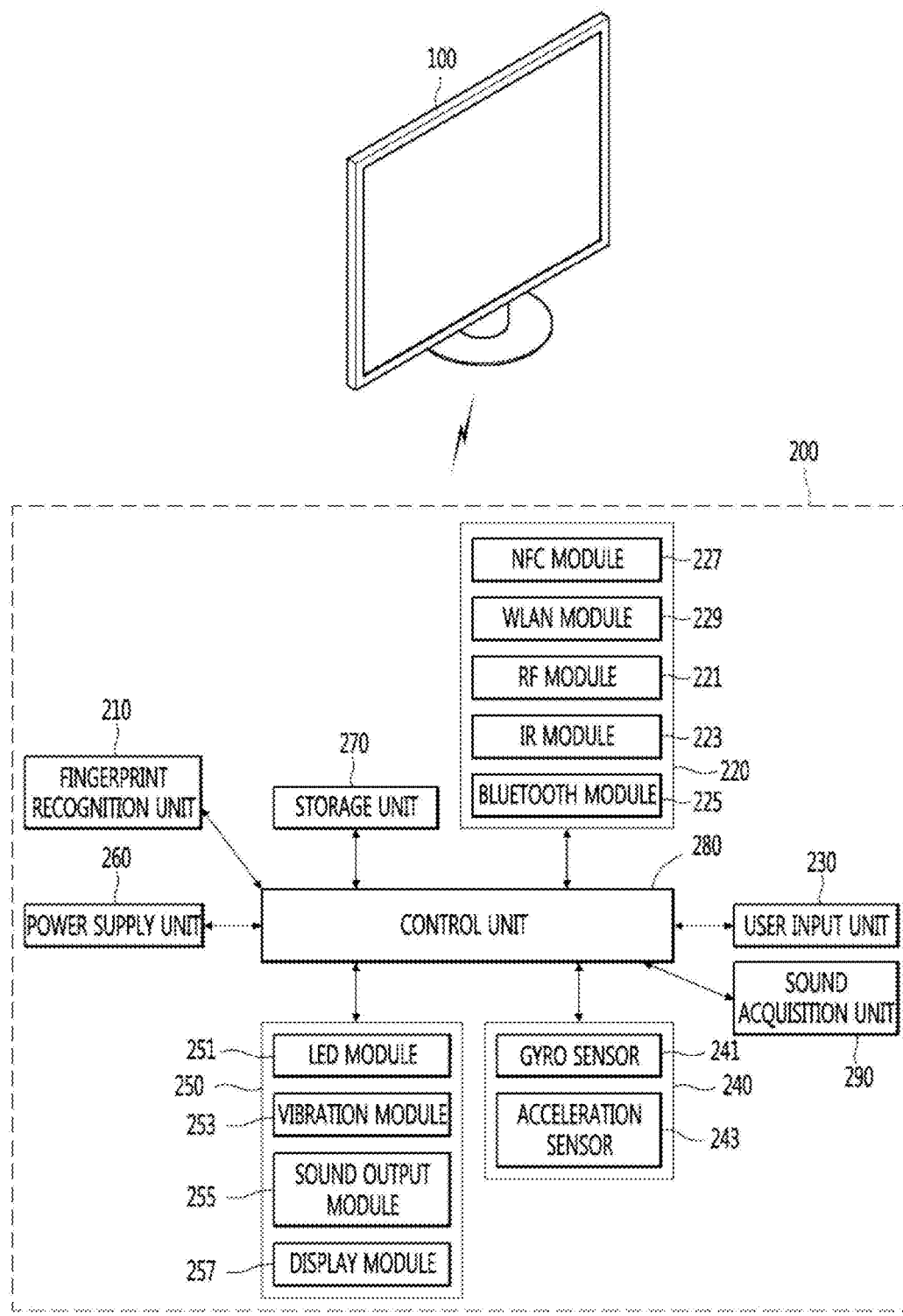

[Figure 3]
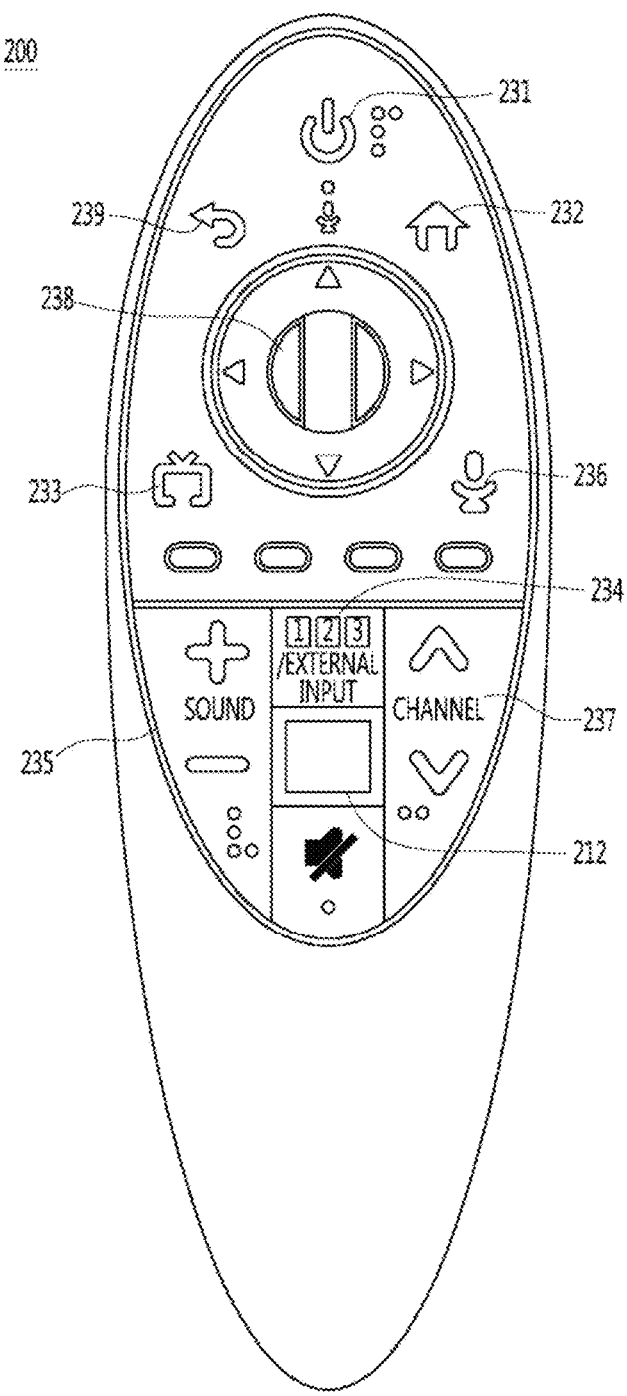

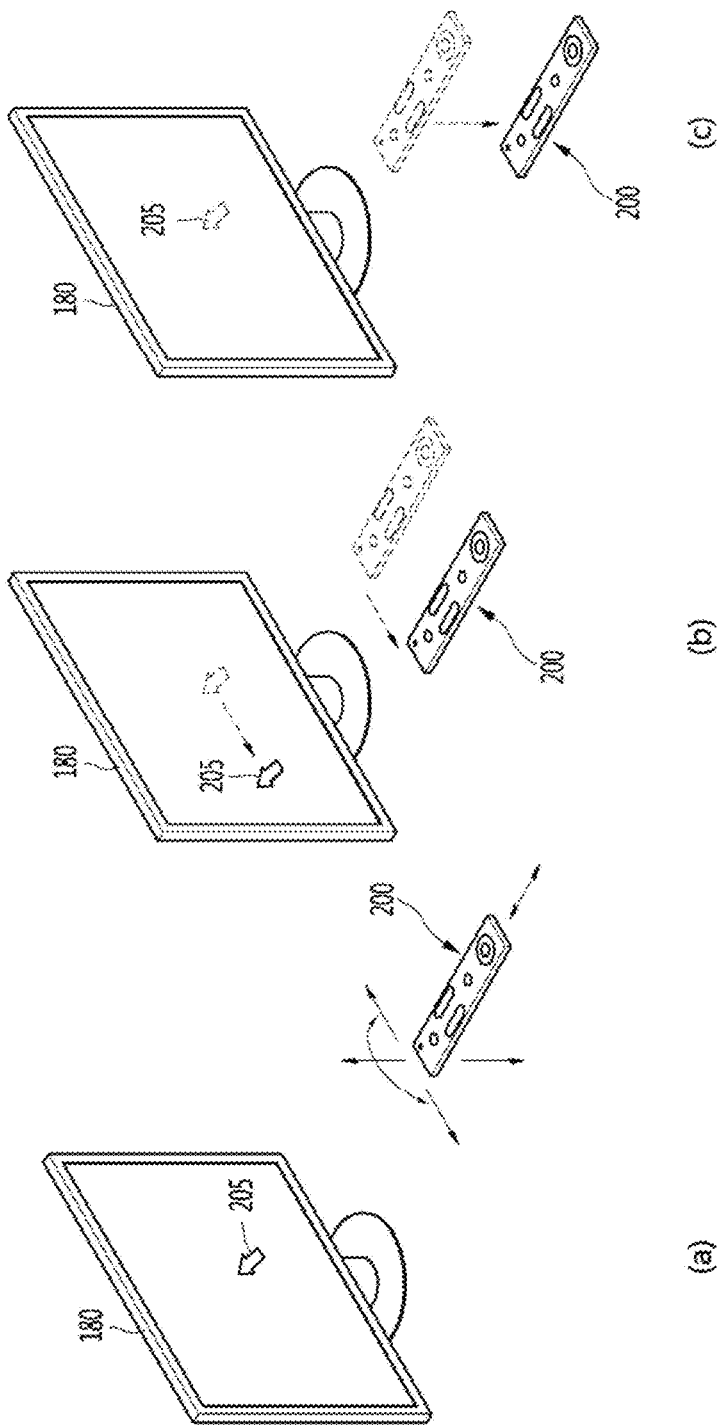
[Figure 4]

[Figure 5]
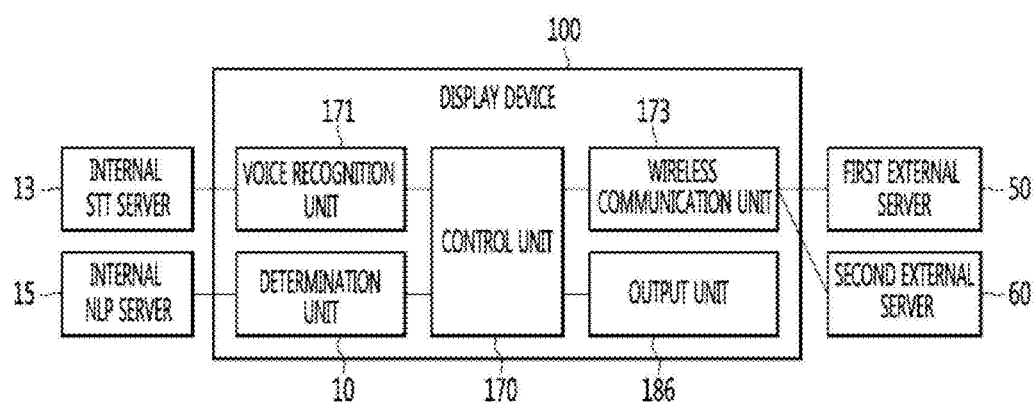

[Figure 6]
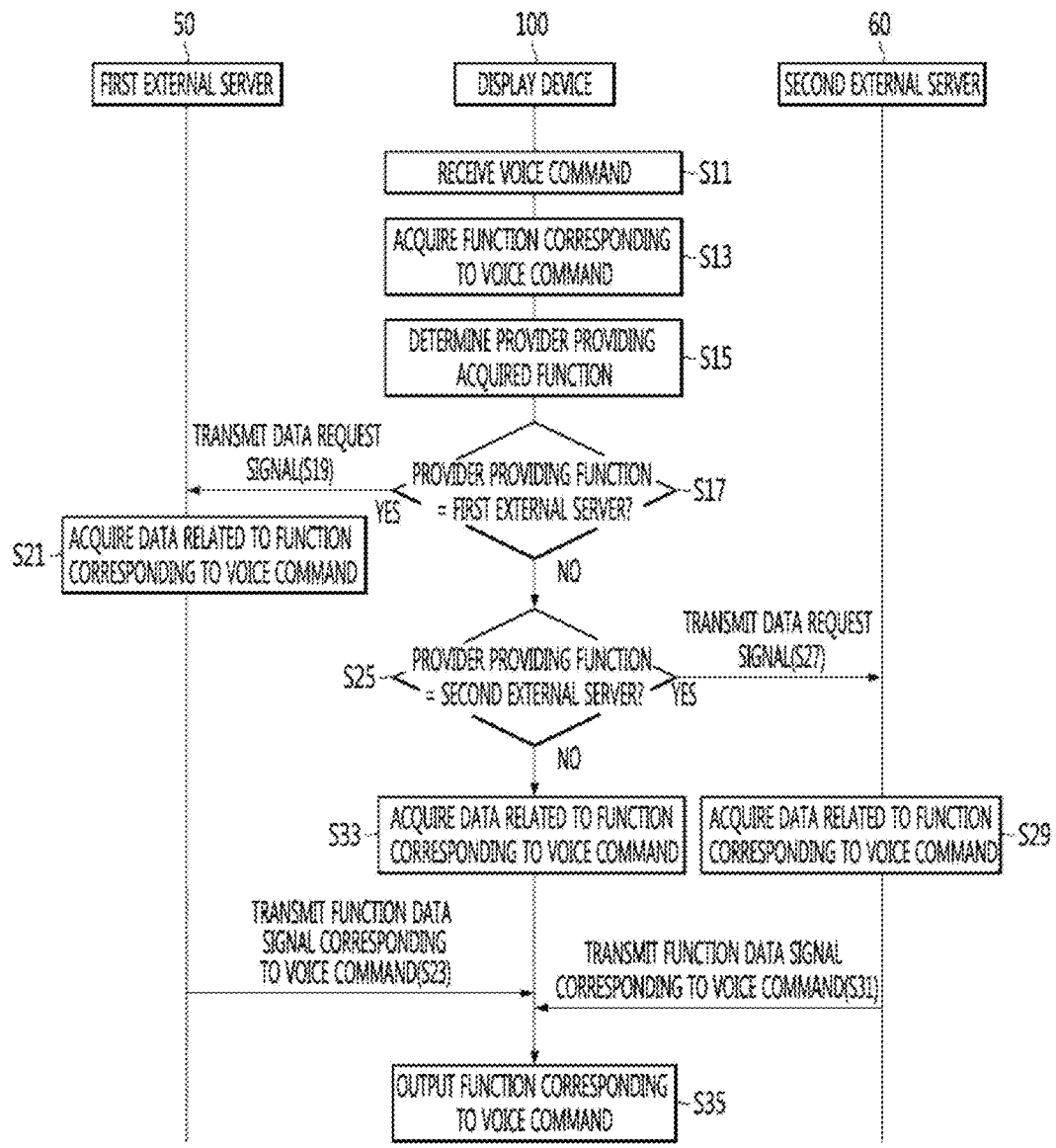

[Figure 7]
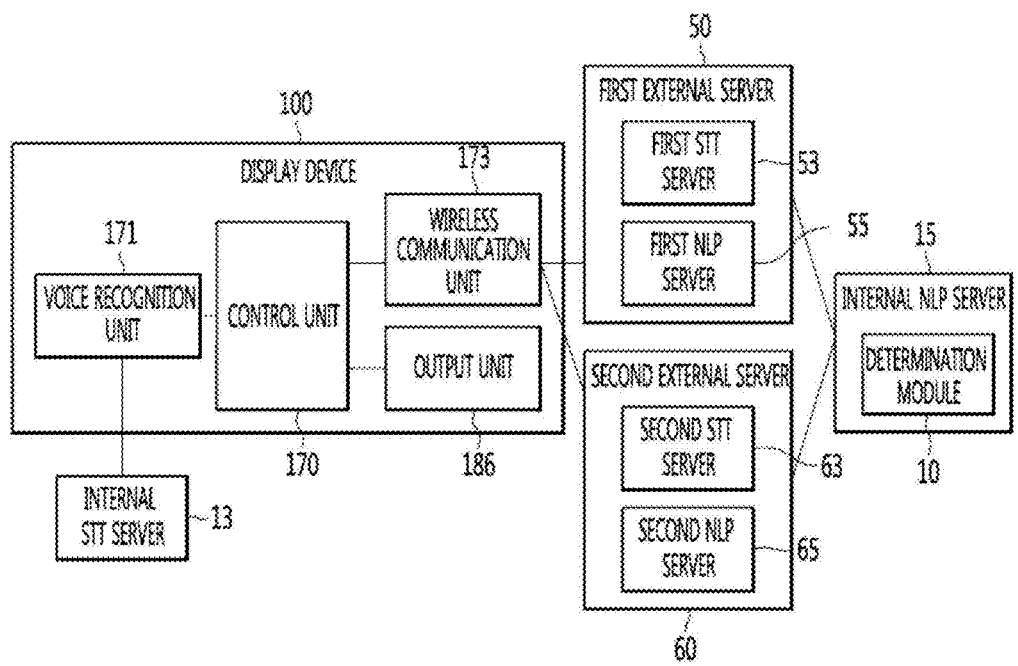

[Figure 8]
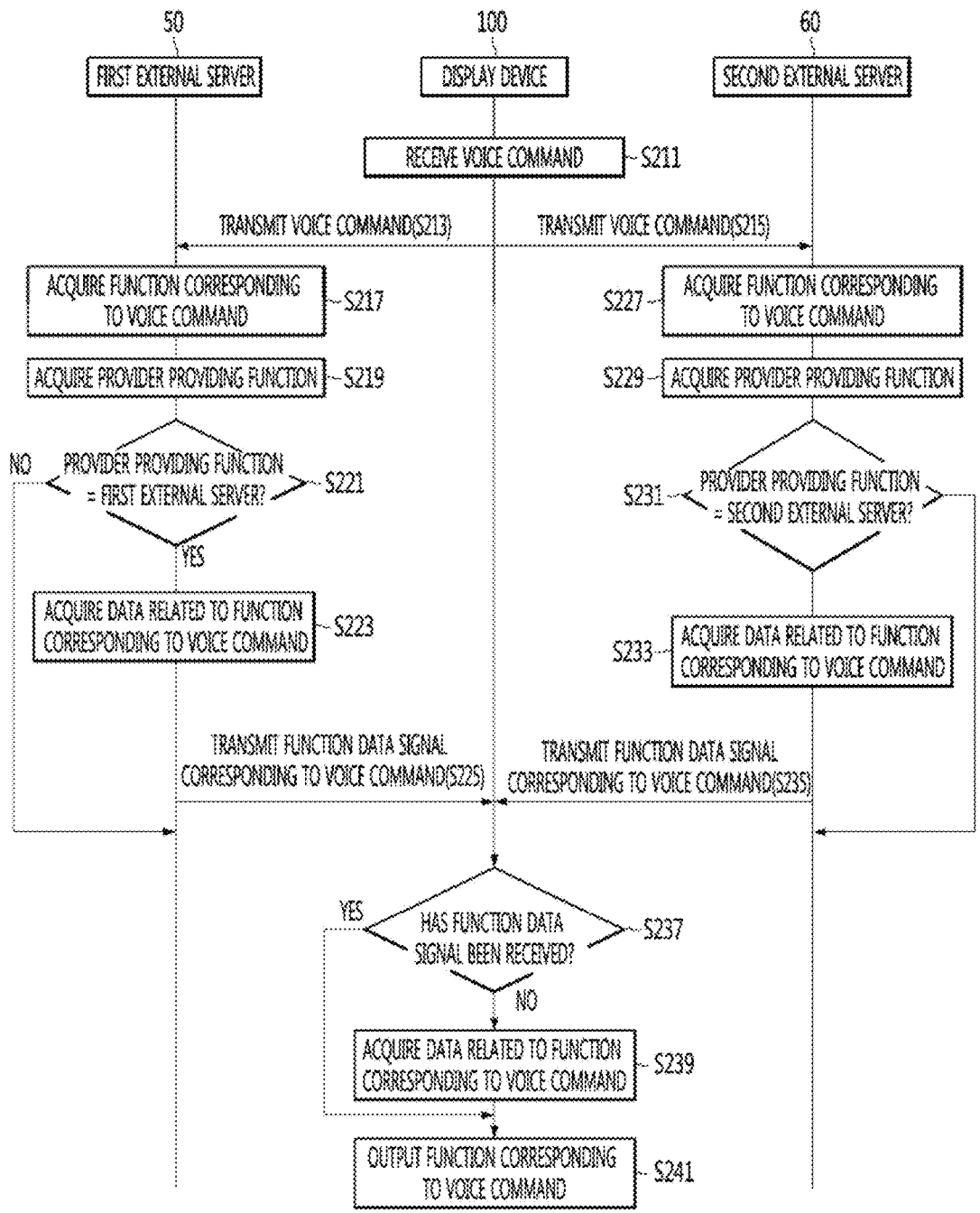

[Figure 9]
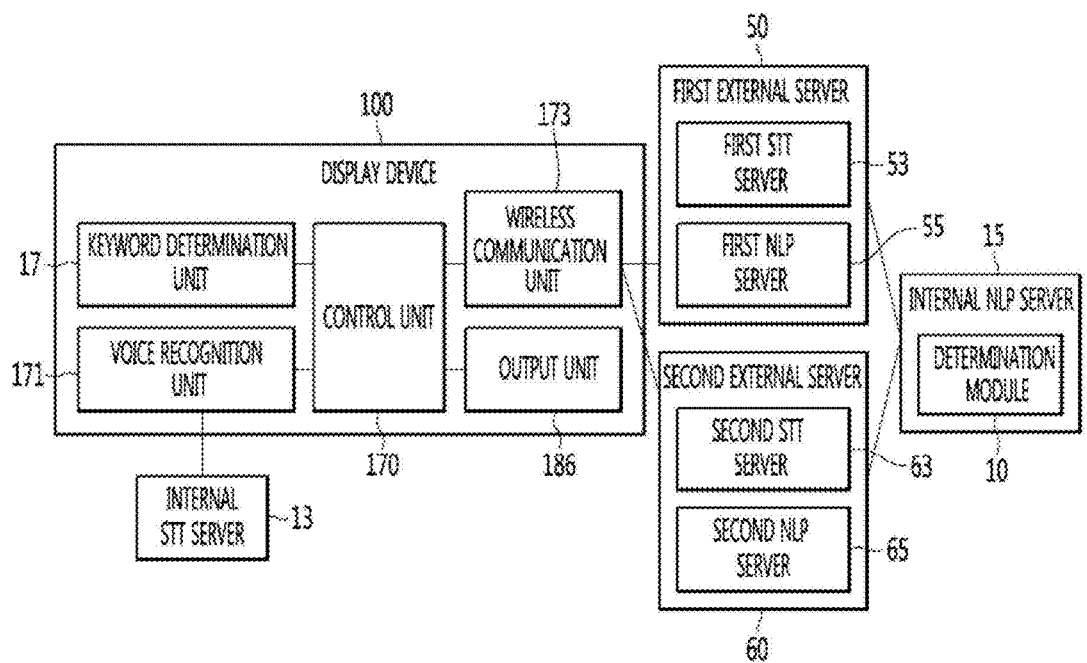

[Figure 10]
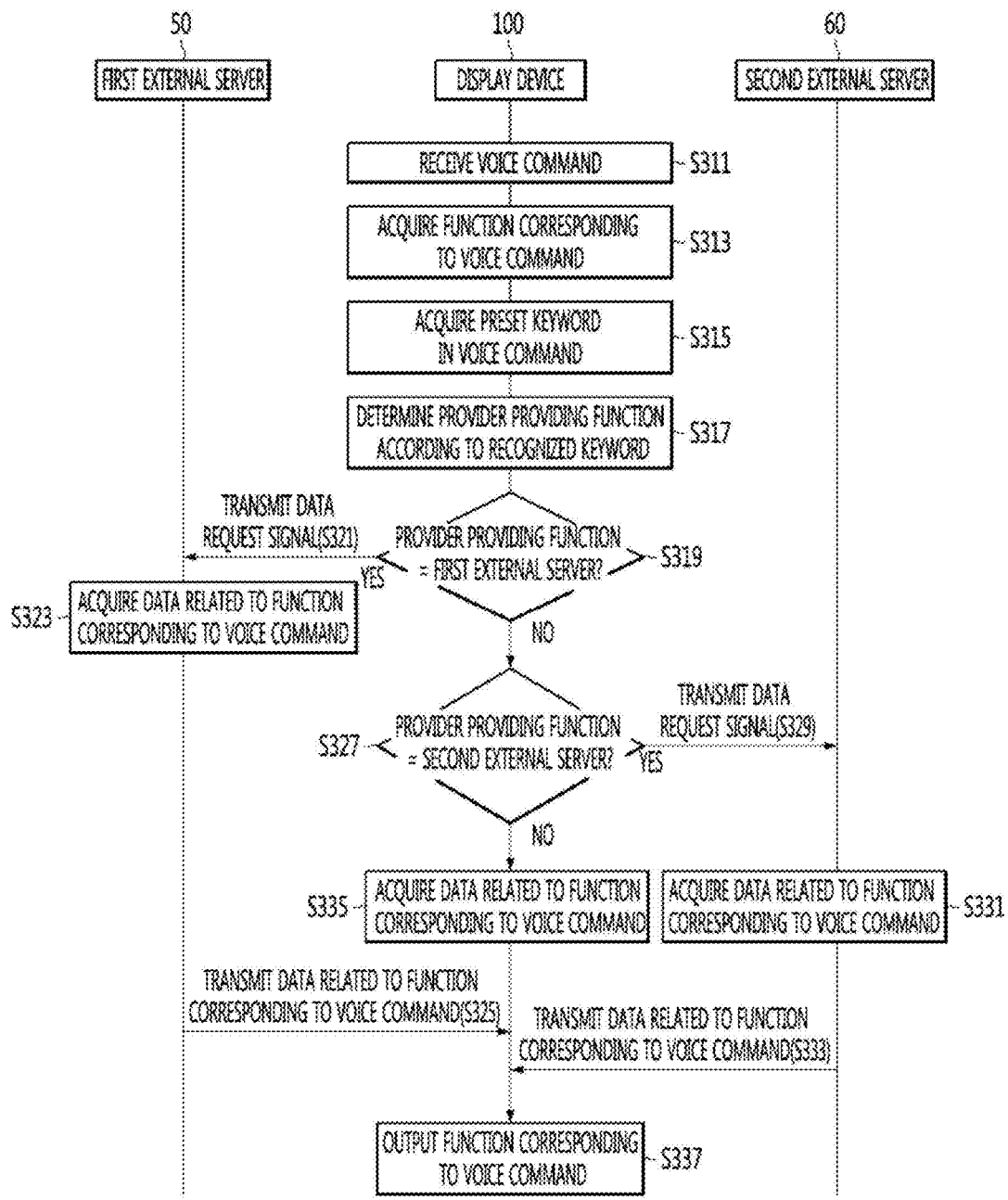

【Figure 11】
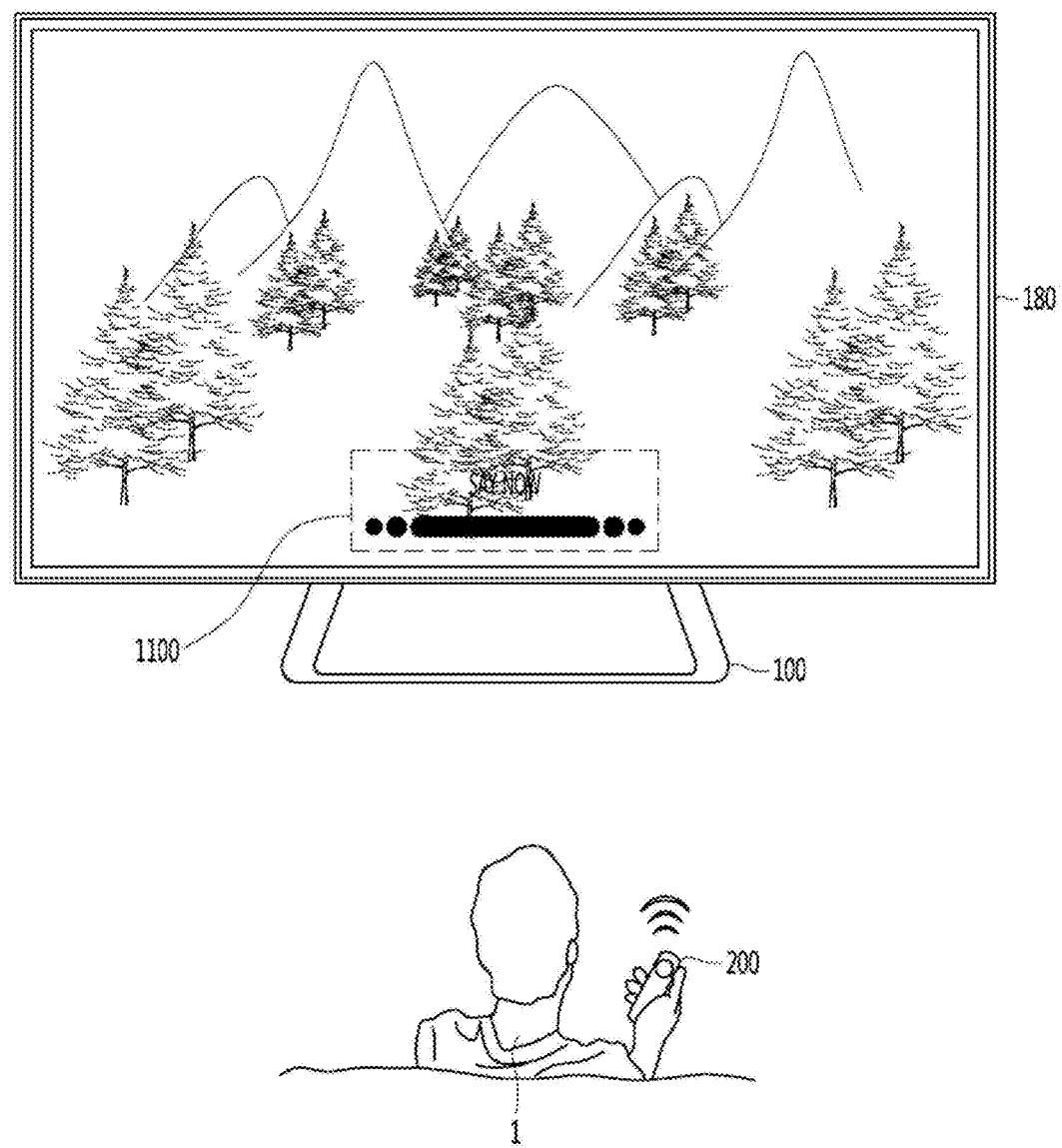

【Figure 12】
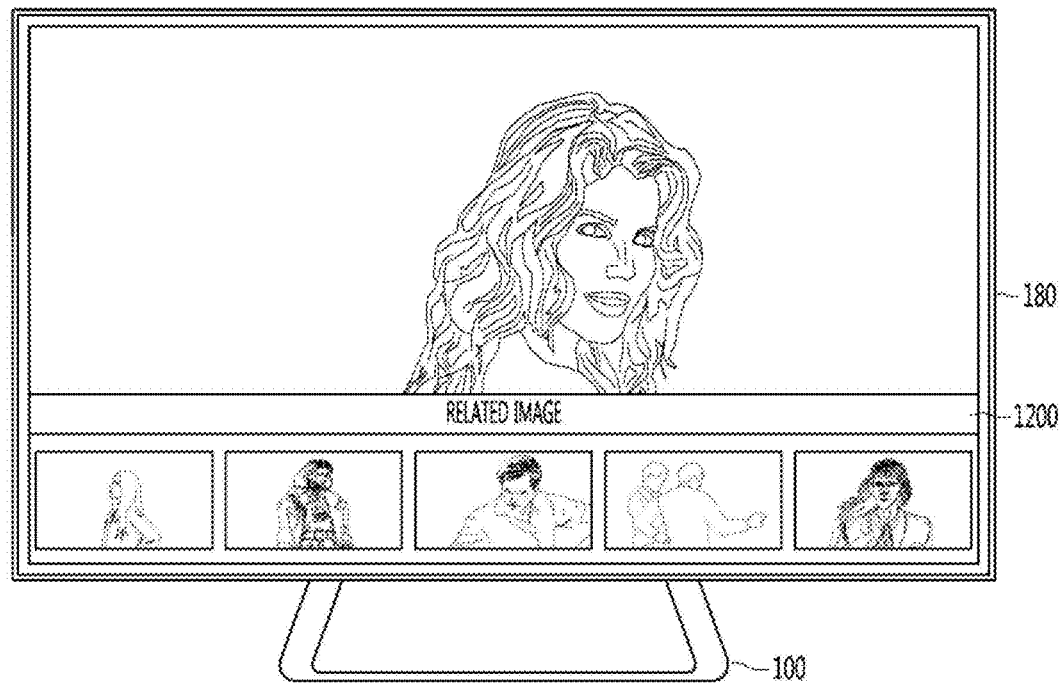
【Figure 13】
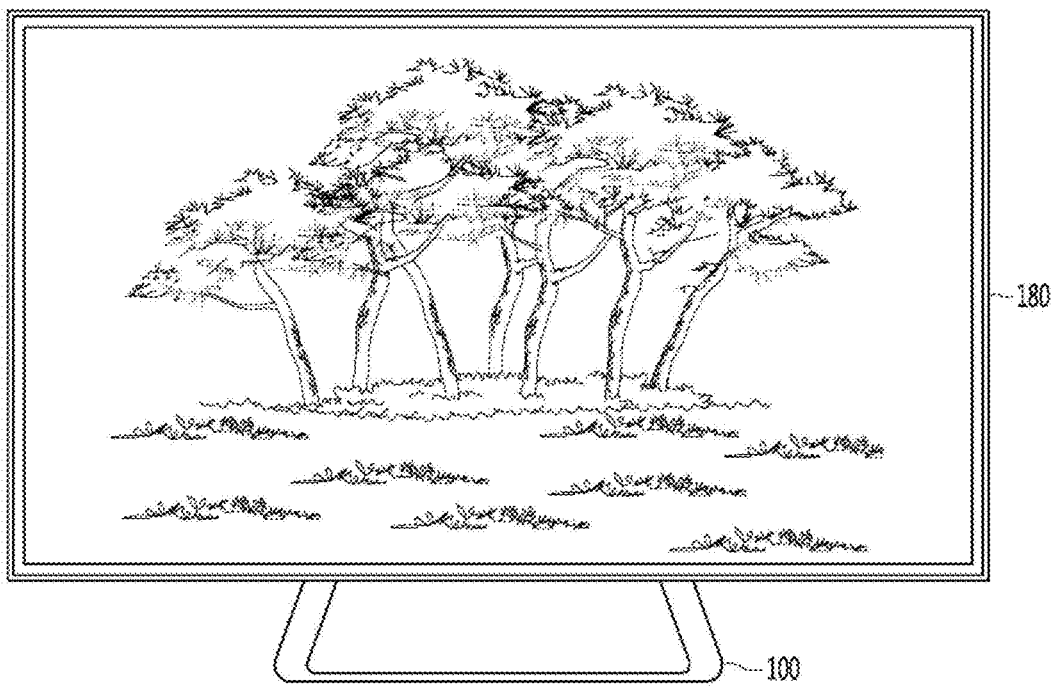

【Figure 14】
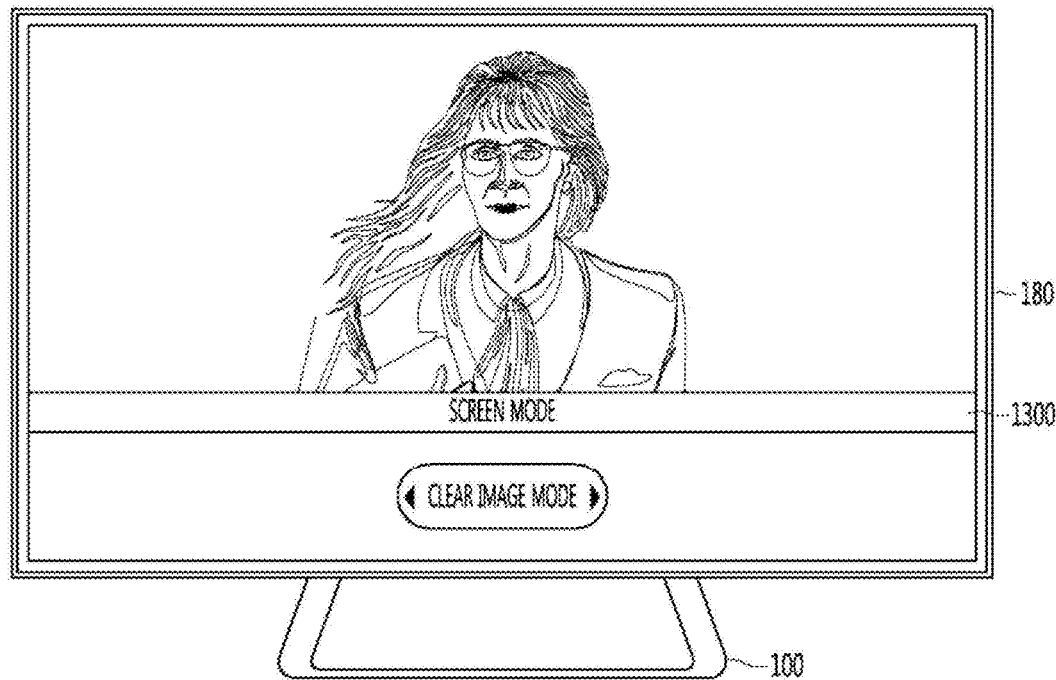
【Figure 15】
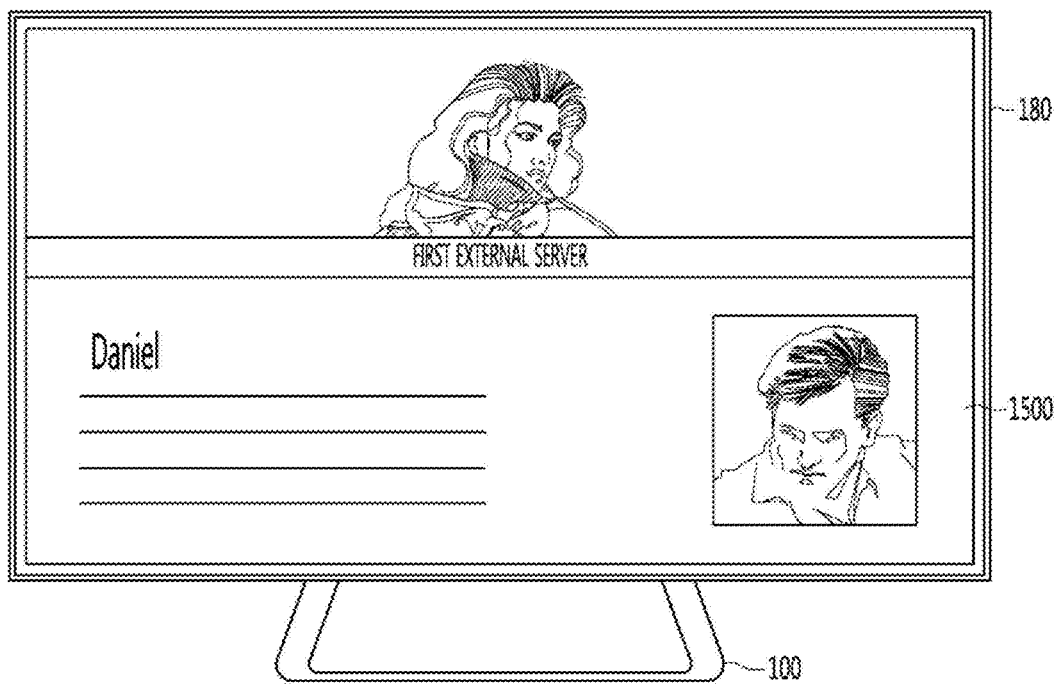

[Figure 16]
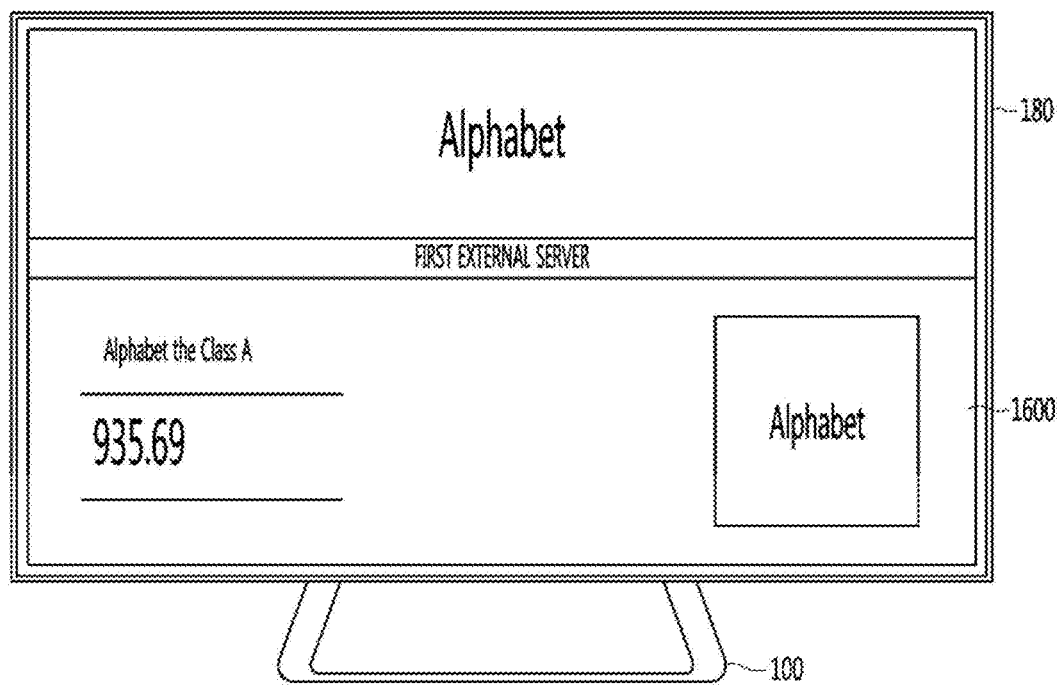
[Figure 17]
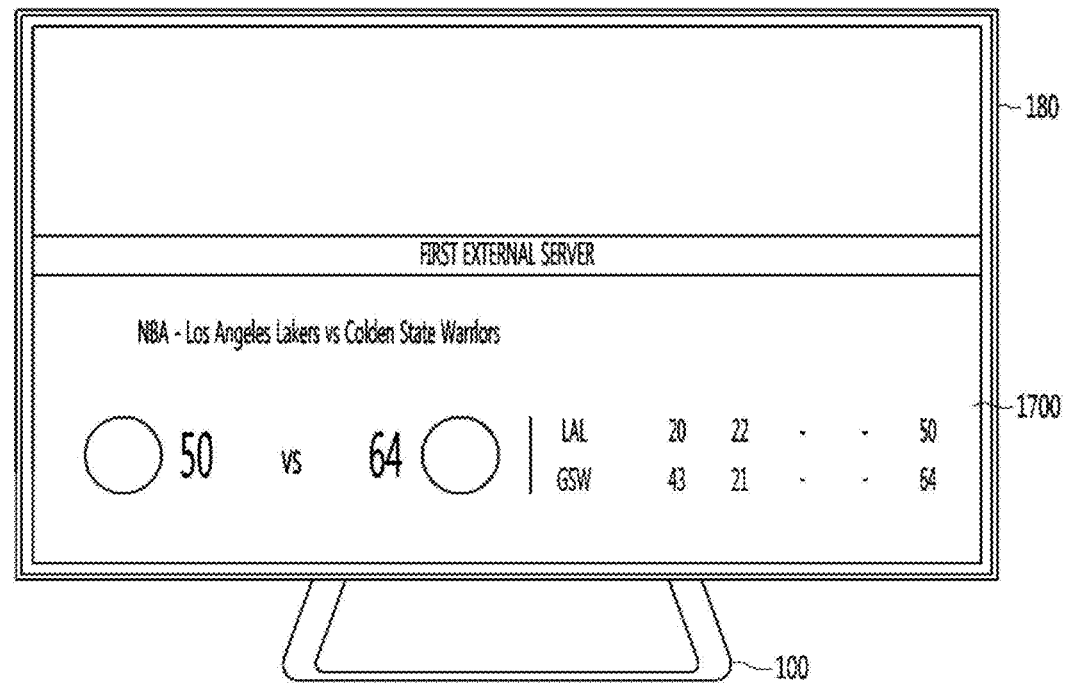

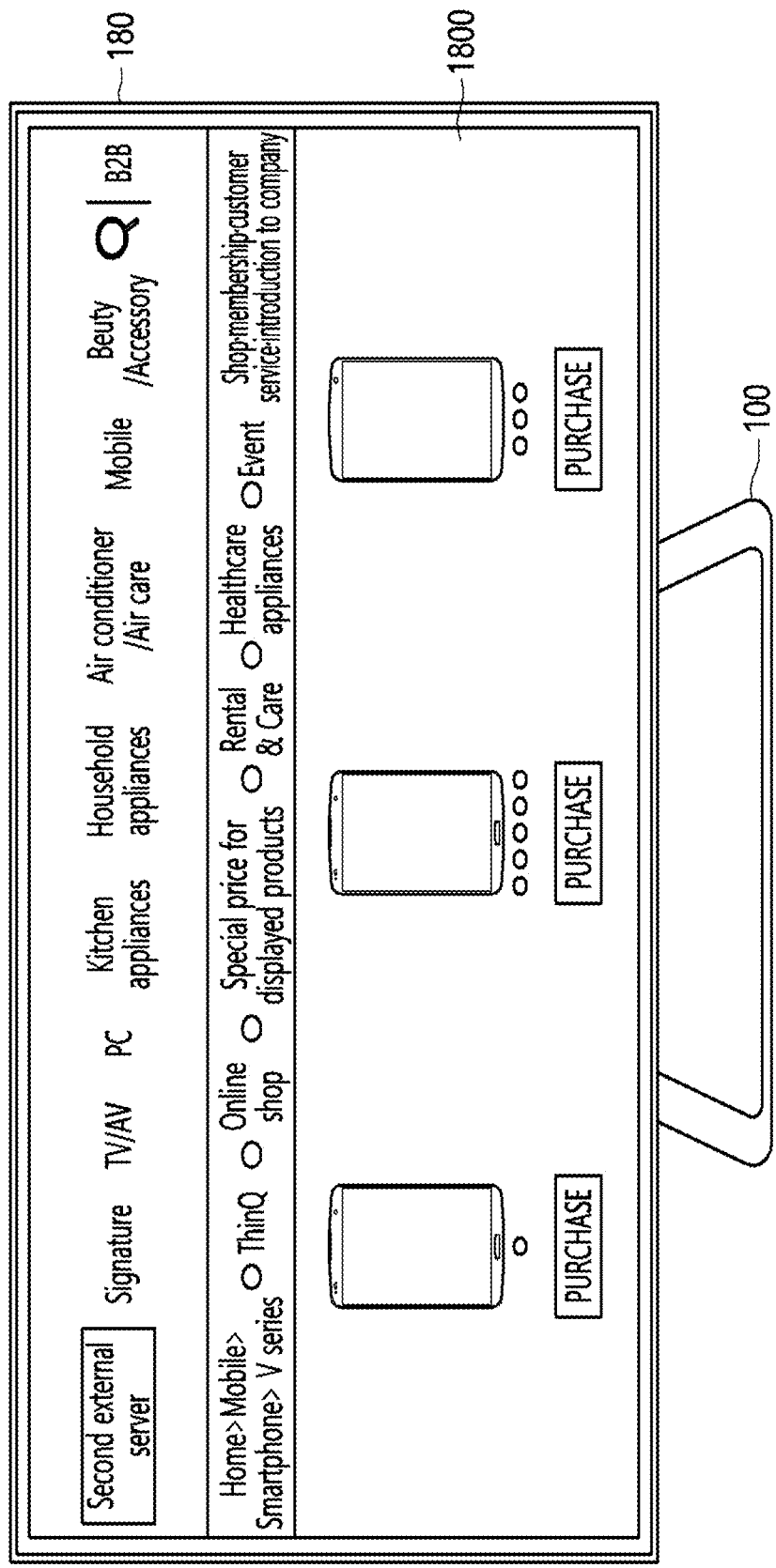

DISPLAY DEVICE AND OPERATING METHOD THEREOF

CROSS-REFERENCE TO RELATED APPLICATIONS

This application is the National Stage filing under 35 U.S.C. 371 of International Application No. PCT/KR2018/003685, filed on Mar. 29, 2018, which claims the benefit of earlier filing date and right of priority to Korean Application No. 10-2018-0020420, filed on Feb. 21, 2018, the contents of which are all hereby incorporated by reference herein in their entirety.

TECHNICAL FIELD

The present invention relates to a display device and an operating method thereof, and more particularly, to a display device for providing a function corresponding to a voice command upon reception of the voice command, and an operating method thereof.

BACKGROUND ART

Recently, digital TV services using wired or wireless communication networks have been generalized. The digital TV services can provide various services which have not been provided in the existing analog broadcasting services.

For example, an Internet protocol television (IPTV) service or a mart TV service, which is one type of the digital TV services, is a bidirectional service which allows a user to actively select the kind, viewing time, or the like of a program to be watched. The IPTV service or the smart TV service can provide various additional services, for example, Internet search, home shopping, on-line games, and the like, based on the bidirectional service capability.

At this time, the services provided by the digital TV can include a service provided from an external server as well as a service provided by the digital TV itself.

Meanwhile, in recent years, artificial intelligence (AI) technology based on speech recognition has rapidly spread. Since speech recognition technology can perform input at a higher speed than inputting texts by typing, research has been actively conducted to improve the accuracy of speech recognition technology.

A variety of techniques are needed to allow machines to understand natural language and enable natural conversation. Speech to Text (STT) technology, which converts a human voice into a text, is preceded so that a machine and a human being communicate with each other by sound. After converting a human voice to a text through speech recognition, a process of analyzing the inputted text in various forms is performed. After analyzing what a human voice represents and what intention a human voice has, if a user has a question about an object, an answer desired by the user is found by using search and semantic techniques. Finally, after a language generating process of making an answer to a user's question in the form of a sentence, the speech is transmitted to the user through a Text to Speech (TTS) which is in contrast to speech recognition.

AI technology based on such speech recognition is applied to many electronic products such as digital TVs. For example, the digital TV can recognize the user's voice, analyze the recognized voice, and provide a service desired by the user.

However, since various services are provided by the digital TV, a service intended by a user cannot be appropriately provided.

DISCLOSURE

Technical Problem

Embodiments of the present invention provide a display device for more accurately providing a function intended by a user upon reception of a voice command, and an operating method thereof.

Technical Solution

According to a first embodiment of the present invention, a display device comprises: a wireless communication unit configured to communicate with at least one external server, a storage unit, a voice recognition unit configured to receive a voice command, a control unit configured to acquire a function corresponding to the voice command, a determination module configured to determine a provider providing the function corresponding to the voice command and an output unit configured to receive data related to the function from the at least one external server or the storage unit according to the determined provider and output the function corresponding to the voice command based on the received data.

According to a second embodiment of the present invention, a display device comprises: a wireless communication unit configured to communicate with at least one external server, a storage unit, a voice recognition unit configured to receive a voice command, a control unit configured to transmit the received voice command to the at least one external server, determine whether data related to a function corresponding to the voice command has been received from the at least one of external server, and acquire data related to the function corresponding to the voice command in the storage unit when the data has not been received from the external server and an output unit configured to output an executed function based on data acquired from the at least one external server or the storage unit.

According to a third embodiment of the present invention, a display device comprises: a wireless communication unit configured to communicate with at least one external servers, a storage unit, a voice recognition unit configured to receive a voice command, a keyword determination unit configured to recognize a preset keyword in the received voice command, a control unit configured to determine a provider providing a function corresponding to the voice command based on the recognized keyword, receive data related to the function from the determined provider, and execute the function corresponding to the voice command and an output unit configured to output the function corresponding to the voice command.

The details of one or more embodiments are set forth in the accompanying drawings and the description below. Other features will be apparent from the description and drawings, and from the claims.

Advantageous Effects

According to an embodiment of the present invention, since the provider providing the function as well as the function providing the voice command is determined upon reception of the voice command, the function corresponding to the voice command can be more quickly and accurately executed.

In addition, since the provider providing the function as well as the function corresponding to the voice command is determined, the function desired by the user can be more accurately executed, thereby improving the satisfaction of the user.

According to an embodiment of the present invention, since the determination module that determines the provider providing the function corresponding to the voice command is provided in the display device, the data obtained by analyzing the voice command need not be transmitted to other servers, and thus the security can be reinforced. Data transmission time can be reduced, and line distance can be reduced, thereby reducing traffic.

According to an embodiment of the present invention, since the determination module that determines the provider providing the function corresponding to the voice command is provided outside the display device, the accuracy of the function execution according to the voice command can be increased, and the size and manufacturing cost of the display device can be maintained.

According to an embodiment of the present invention, since the provider providing the function corresponding to the voice command is determined through the keyword, the determination module need not be provided, thereby reducing the manufacturing cost and the size thereof. Since the information about the voice command is not transmitted to all external servers, the traffic reduction effect can be obtained.

DESCRIPTION OF DRAWINGS

FIG. 1 is a block diagram illustrating a configuration of a display device according to an embodiment of the present invention.

FIG. 2 is a block diagram illustrating a remote control device according to an embodiment of the present invention.

FIG. 3 is a view illustrating an actual configuration of a remote control device according to an embodiment of the present invention.

FIG. 4 is a view of utilizing a remote control device according to an embodiment of the present invention.

FIG. 5 is a control block diagram for describing a method by which a display device executes a function corresponding to a voice command upon reception of the voice command according to a first embodiment of the present invention.

FIG. 6 is a ladder diagram for describing a method by which a display device executes a function corresponding to a voice command upon reception of the voice command according to a first embodiment of the present invention.

FIG. 7 is a control block diagram for describing a method by which a display device executes a function corresponding to a voice command upon reception of the voice command according to a second embodiment of the present invention.

FIG. 8 is a ladder diagram for describing a method by which a display device executes a function corresponding to a voice command upon reception of the voice command according to a second embodiment of the present invention.

FIG. 9 is a control block diagram for describing a method by which a display device executes a function corresponding to a voice command upon reception of the voice command according to a first embodiment of the present invention.

FIG. 10 is a ladder diagram for describing a method by which a display device executes a function corresponding to a voice command upon reception of the voice command according to a third embodiment of the present invention.

FIG. 11 is a diagram illustrating an output of an output unit when a display device receives a voice command, according to an embodiment of the present invention.

FIGS. 12 to 14 are diagrams illustrating outputs of an output unit when a provider providing a function corresponding to a voice command is a display device, according to an embodiment of the present invention.

FIGS. 15 to 17 are diagrams illustrating outputs of an output unit when a provider providing a function corresponding to a voice command is a first external server, according to an embodiment of the present invention.

FIGS. 18 and 19 are diagrams illustrating outputs of an output unit when a provider providing a function corresponding to a voice command is a second external server, according to an embodiment of the present invention.

MODE FOR INVENTION

Figure 19:
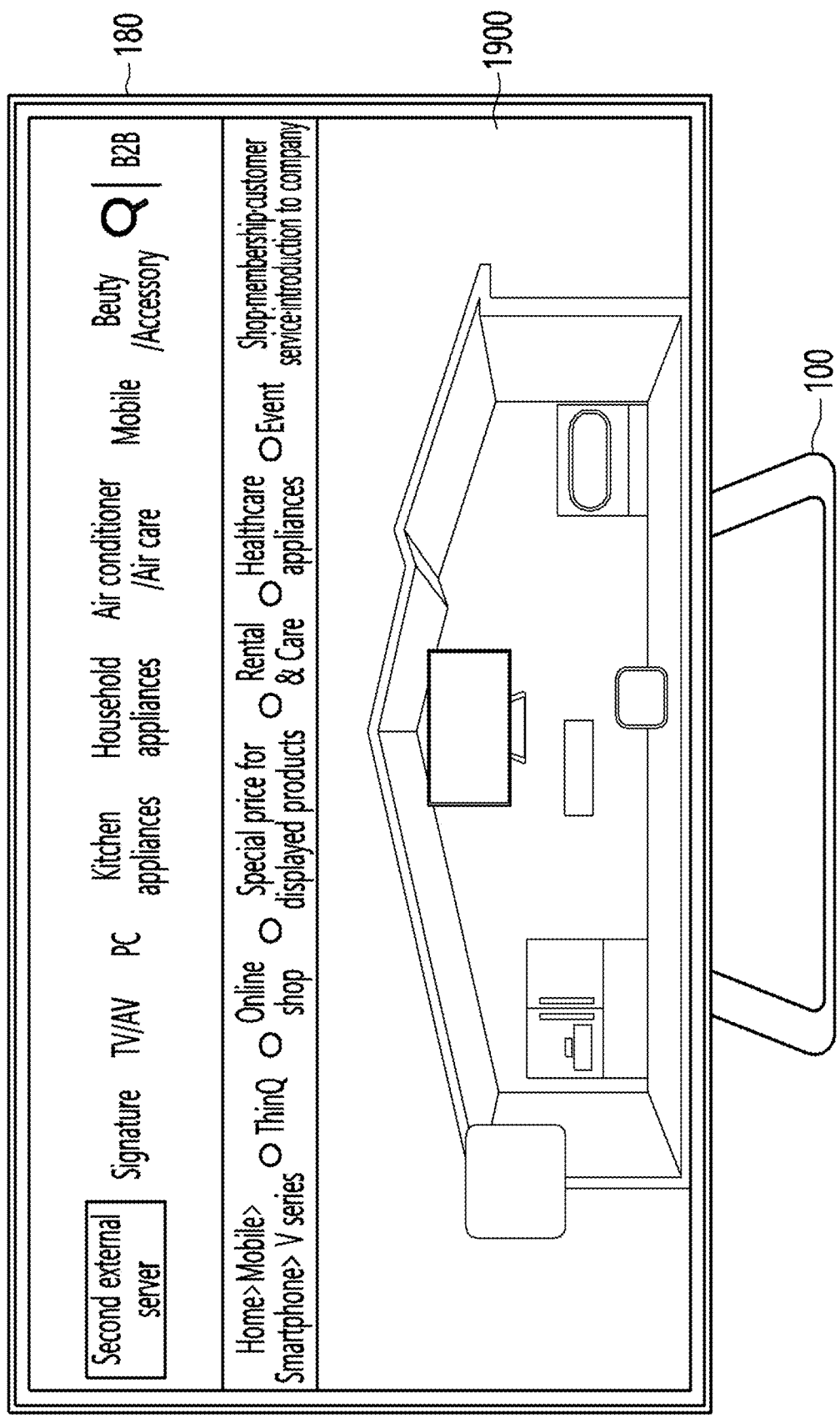

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control unit 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The wireless communication unit 173 can be provided separated from the external device interface unit 135 and can be included in the external device interface unit 135.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice.

The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200. For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 230 or a signal corresponding to a movement of the remote control device 200 sensed by the sensor unit 240 to the display device 100 through the wireless communication unit 220.

Additionally, the voice acquisition unit 290 of the remote control device 200 can obtain voice.

The voice acquisition unit 290 can include at least one microphone 291 and obtain voice through the microphone 291.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

FIG. 5 is a control block diagram for describing a method by which a display device executes a function corresponding to a voice command upon reception of the voice command according to a first embodiment of the present invention, and FIG. 6 is a ladder diagram for describing a method by which a display device executes a function corresponding to a voice command upon reception of the voice command according to a first embodiment of the present invention.

First, elements and roles of a display device according to a first embodiment of the present invention will be described with reference to FIG. 5.

The display device 100 can include a voice recognition unit 171 configured to recognize a voice command, a wireless communication unit 173 configured to transmit/receive a signal to/from a provider providing a function corresponding to the voice command, a control unit 170 configured to execute the function corresponding to the voice command, an output unit 186 including a display unit 180 configured to visually output a result of executing the function and an audio output unit 185 configured to audibly output the result of executing the function.

According to the first embodiment of the present invention, the display device 100 can further include a determination module 10 configured to determine the provider providing the function corresponding to the voice command. However, the respective elements illustrated in FIG. 5 only show main elements for convenience of explanation, and the display device 100 can include more or fewer elements than the elements illustrated in FIG. 5.

According to an embodiment, the determination module 10 can be provided in the display device 100, or can be provided in an internal NLP server 15. The determination module 10 according to the first embodiment of the present invention can be provided in the display device 100, and the determination module 10 according to the second and third embodiments of the present invention can be provided in the internal NLP server 15.

The determination module 10 is an element configured to determine the provider providing the function corresponding to the voice command, and can determine the provider providing data related to the function corresponding to the voice command. A method by which the determination module 10 determines the provider providing the function corresponding to the voice command will be described below.

The voice recognition unit 171 can include a voice input unit (not shown) such as a microphone configured to receive a voice command of a user.

The voice input unit (not shown) can be provided as an element separate from the voice recognition unit 171. The voice input unit can be included in the user input interface unit 150 described with reference to FIG. 1.

The voice recognition unit 171 can process a voice command of a user inputted through the microphone into electrical voice data.

When the voice command of the user is received, the voice recognition unit 171 can transmit the voice command of the user to an internal STT server 13. The internal STT server 13 can convert voice data included in the voice command into text data in a text format, and transmit the text data to the voice recognition unit 171.

The internal STT server 13 can mean a Speech-to-Text (STT) server connected to the display device 100 to convert the voice command received by the display device 100 into text data. The internal STT server is named for distinguish the STT server provided in the external server, and the internal STT server is not limited to the name.

The internal STT server 13 and an internal NLP server 15 to be described below can be connected to the display device 100 through the network interface unit 133.

The voice recognition unit 171 can transmit the voice command converted into the text data to the control unit 170, and the control unit 170 can analyze the voice command converted into the text data to acquire the function corresponding to the voice command. That is, the control unit 170 can analyze what function the user inputs as the voice command.

The function can mean a service that is executed by the display device 100 and can be provided, and can include not only essential services necessary for the operation of the display device 100 but also auxiliary services provided for the purpose of convenience, fun, and the like. For example, the function can include a channel/volume change, a screen setting, a content search, an application, a gallery mode, and Internet of Things (IoT).

The determination module 10 can determine the provider providing the function corresponding to the voice command.

For example, the function corresponding to the voice command can be a function provided by the display device 100 itself or a function provided by at least one external server.

The determination module 10 can determine whether the provider providing the function corresponding to the voice command is the display device 100, the first external server 50, or the second external server 60.

The determination module 10 can transmit the voice command converted into the text data to the internal NLP server 15, and the internal NLP server 15 can receive the voice command of the text data form from the determination module 10. The internal NLP server 15 can mechanically analyze the voice command of the text data form to acquire the function intended by the text data. The internal NLP server 15 can transmit the acquired function to the determination module 10.

Similarly, the internal NLP server 15 can mean a natural language processing (NLP) server connected to the display device 100 and analyzing a user's intention according to a voice command inputted to the display device 100. The internal NLP server is named for distinguish the NLP server provided in the external server, and the internal NLP server is not limited to the name.

The wireless communication unit 173 can transmit/receive data to/from at least one external server. For example, the wireless communication unit 173 can transmit/receive data to/from the first external server 50 and the second external server 60, but this is merely illustrative. The wireless communication unit 173 can transmit/receive data to/from two or more external servers.

The wireless communication unit 173 can transmit a data request signal for requesting data for performing a specific function to at least one external server, and can receive a function data signal in response to the data request signal. The function data signal can mean data related to the function according to the data request signal, and can include data used for performing the function according to the data request signal.

When the first external server 50 or the second external server 60 receives the data request signal, the first external server 50 or the second external server 60 can acquire data related to the function according to the data request signal and transmit the functional data signal to the display device 100.

Meanwhile, according to an embodiment, the first external server 50 and the second external server 60 may not include the STT server and the NLP server. The wireless communication unit 173 can transmit the data request signal including the function corresponding to the voice command to any one of the external servers 50 and 60 based on the determination result of the determination module 10, and the external servers 50 and 60 can transmit, to the wireless communication unit 173, data for executing the function included in the received data request signal. That is, the external server 50 an 60 can transmit the function data signal without analyzing the function corresponding to the voice command.

Accordingly, there is an advantage that can save the time required for analyzing the voice command in the external servers 50 and 60.

Meanwhile, according to another embodiment, each of the external servers 50 and 60 can include an STT server and an NLP server. For example, referring to FIG. 7, the first external server 50 can include a first STT server 53 and a first NLP server 55, and the second external server 60 can include a second STT server 60 and a second NLP server 65. In this case, the external servers 50 and 60 can acquire the function by analyzing the voice command, and thus it is possible to compare with the analysis result of the voice command of the display device 100, thereby improving the analysis accuracy of the voice command The wireless communication unit 173 can receive the function data signal from the first external server 50 or the second external server 60.

The control unit 170 can execute the function corresponding to the voice command through the data included in the function data signal received from the first external server 50 or the second external server 60.

The output unit 186 can output the function execution result through at least one of the display unit 180 and the audio output unit 185.

Next, a method by which a display device executes a function corresponding to a voice command upon reception of the voice command, according to a first embodiment of the present invention, will be described with reference to FIG. 6.

First, the voice recognition unit 171 of the display device 100 can receive a voice command of a user (S11).

Specifically, at least one of the display device 100 and the remote control device 200 interworking with the display device 100 can include a voice input unit (not shown) configured to receive a voice command, such as a microphone, and the voice recognition unit 171 can receive a voice command through the voice input unit (not shown).

The control unit 170 of the display device 100 can acquire a function corresponding to the voice command (S13), and can determine a provider providing the acquired function (S15).

The voice recognition unit 171 can transmit the voice command to the internal STT server 13, and the internal STT server 13 can receive the voice command and convert the voice command into a text data form. The internal STT server 13 can transmit the voice command converted into the text data form to the voice recognition unit 171.

The voice recognition unit 171 can transmit the received voice command of the text data form to the control unit 170. The control unit 170 can transmit the voice command of the text data form to the determination module 10, and the determination module 10 can transmit the voice command of the text data form to the internal NLP server 15 so as to determine the function corresponding to the voice command and the provider providing the function.

The internal NLP server 15 can analyze the voice command of the text data form based on the data stored in a previously established natural language recognition processing database. For example, the internal NLP server 15 can compare the text data according to the voice command with data established in the natural language recognition processing database so as to analyze whether there is a matching text, thereby acquiring the function corresponding to the voice command. However, this is merely an example, and the internal NLP server 15 can acquire the function corresponding to the voice command in various methods.

The internal NLP server 15 can transmit the function corresponding to the voice command to the determination module 10, and the determination module 10 can determine the provider providing the function corresponding to the voice command.

According to an embodiment, the determination module 10 can store a table in which a plurality of functions and a plurality of providers that provide the respective functions are mapped, and can determine a provider corresponding to the acquired function based on the table.

According to another embodiment, the determination module 10 can store execution information of each function executed in the display device 100, and can acquire the provider providing the function through the stored execution information. In addition, the determination module 10 can determine the provider providing the function corresponding to the voice command in various methods.

The internal NLP server 15 can acquire the function corresponding to the voice command and the provider providing the function and transmit the acquired function and the acquisition result to the determination module 10.

According to an embodiment, the internal NLP server 15 can transmit function information corresponding to the voice command and provider information to the determination module 10 as a single signal, or can transmit the function information corresponding to the voice command and the provider information as separate signals.

The control unit 170 of the display device 100 can determine whether the provider providing the acquired function is a specific external server or the display device 100.

The control unit 170 of the display device 100 can determine whether the provider providing the acquired function is the first external server 50 (S17).

The control unit 170 can determine whether the provider providing the function is the first external server 50 based on the function corresponding to the voice command and the result of analyzing the provider providing the function.

When the control unit 170 determines that the provider providing the function is the first external server 50, the control unit 170 can transmit a data request signal to the first external server 50 (S19).

The data request signal can be a signal requesting data for performing the function corresponding to the voice command.

Upon reception of the data request signal, the first external server 50 can acquire data related to the function corresponding to the voice command (S21).

The first external server 50 can be a provider providing at least one or more functions. The first external server 50 can store data related to the function for executing at least one function. For example, the first external server 50 can be a provider providing a first function and a second function, and can store data related to the first function and data related to the second function.

The data related to the function can mean data necessary for executing the function. When the first external server 50 acquires the data related to the function corresponding to the voice command, the first external server 50 can transmit the function data signal corresponding to the voice command to the display device 100 (S23).

The function data signal corresponding to the voice command can mean a signal including the data related to the function corresponding to the voice command. That is, the first external server 50 can transmit data necessary for executing the function corresponding to the voice command to the display device 100 through the function data signal.

Meanwhile, when the control unit 170 of the display device 100 determines in operation S17 that the provider providing the function is not the first external server 50, the control unit 170 of the display device 100 can determine whether the provider providing the function is the second external server 60 (S25).

*158 Similarly, when the control unit 170 of the display device 100 determines that the provider providing the function is the second external server 60, the control unit 170 of the display device 100 can transmit the data request signal to the second external server 60 (S27).

Upon reception of the data request signal, the second external server 60 can acquire data related to the function corresponding to the voice command (S29), and can transmit a function data signal corresponding to the voice command to the display device 100 (S31). Since operations S27, S29, and S31 are the same as those described in operations S19, S21, and S23, respectively, a detailed description thereof will be omitted.

When the control unit 170 of the display device 100 determines in operation S25 that the provider providing the function is not the second external server 60, the control unit 170 of the display device 100 can determine that the provider providing the function is the display device 100. That is, the control unit 170 can determine that the function corresponding to the voice command is a function provided by the display device 100 itself.

When the control unit 170 of the display device 100 determines that the provider providing the function is the display device 100, the control unit 170 of the display device 100 can acquire data related to the function in the storage unit 140. In addition, when the control unit 170 of the display device 100 determines that the provider providing the function is the display device 100, the control unit 170 of the display device 100 can acquire data related to the function in the network interface unit 133 or the external device interface unit 135.

FIG. 5 shows an example in which the external server includes only the first external server 50 and the second external server 60. The display device 100 can determine whether a plurality of external servers are the provider providing the function, without being limited to the first and second external servers 50 and 60.

Alternatively, according to an embodiment, the control unit 170 of the display device 100 first confirms whether the provider providing the function is the display device 100, and when the provider providing the function is not the display device 100, the control unit 170 of the display device 100 can sequentially determine whether each of the external servers is the provider providing the function.

Alternatively, according to an embodiment, the control unit 170 of the display device 100 can transmit the data request signal to the external server corresponding to the provider providing the function, which is determined in operation S15, without determining whether each of the external servers is the provider providing the function.

The control unit 170 of the display device 100 can acquire data related to the function corresponding to the voice command through operation S23, S31, or S33.

The output unit 186 of the display device 100 can output the function corresponding to the voice command (S35).

Specifically, the control unit 170 can execute the function corresponding to the voice command by using the acquired data related to the function. The control unit 170 can output the function through at least one of the display unit 180 and the audio output unit 185 by executing the function corresponding to the voice command.

At this time, the control unit 170 can differently output function according to the provider providing the data related to the function. Specifically, even if the types of the functions are the same, the output forms of the functions can be different according to the providers. For example, even if the types of the functions are the same as "search", the control unit 170 can be different in the output form of the function in a case where the function is executed with data received from the first external server 50 and a case where the function is executed with data received from the second external server 60. This can use different formats according to the provider providing the function, and the preferred format can be different for each user. Accordingly, upon reception of the voice command, if the intention of the user is analyzed, the provider providing the corresponding function is determined, and the function is executed, the user's satisfaction can be further satisfied.

A method by which the control unit 170 executes and outputs the function through the data related to the function will be described later with reference to FIGS. 12 to 19.

According to the first embodiment of the present invention, the display device 100 includes the determination module 10 therein, and does not perform communication with a server that is not related to the function corresponding to the voice command. Therefore, since the data obtained by analyzing the voice command need not be transmitted to other servers, the security can be reinforced, data transmission time can be reduced, and line distance can be reduced, thereby reducing traffic.

FIG. 7 is a control block diagram for describing a method by which a display device executes a function corresponding to a voice command upon reception of the voice command according to a second embodiment of the present invention, and FIG. 8 is a ladder diagram for describing a method by which a display device executes a function corresponding to a voice command upon reception of the voice command according to a second embodiment of the present invention.

FIG. 7 shows a main configuration of a display device 100 according to a second embodiment of the present invention. The display device 100 can include a voice recognition unit 171, a wireless communication unit 173, an output unit 186, and a control unit 170. At this time, the display device 100 cannot include a determination module 10 therein and can be connected through the wireless communication unit 173, and the determination module 10 can be provided in an internal NLP server 15.

A description about the same elements as those described with reference to FIG. 5 will be omitted.

The wireless communication unit 173 can communicate with one or more external servers 50 and 60, and the external servers 50 and 60 can communicate with the internal NLP server 15.

The determination module 10 provided in the internal NLP server 15 can determine the provider providing the function corresponding to the voice command and transmit the determination result to the external servers 50 and 60, and the external servers 50 and 60 can transmit information about the provider providing the function, which is received from the internal NLP server 15, to the display device 100.

According to the second embodiment, each of the external servers can include an STT server and an NLP server. That is, the first external server 50 can include a first STT server 53 and a first NLP server 55, and the second external server 60 can include a second STT server 60 and a second NLP server 65. Since each of the external servers includes the STT server and the NLP server, each of the external servers can determine the function corresponding to the voice command and the provider providing the function.

A method by which a display device executes a function corresponding to a voice command upon reception of the voice command, according to a second embodiment of the present invention, will be described with reference to FIG. 8.

The voice recognition unit 171 of the display device 100 can receive a voice command (S211).

The voice recognition unit 171 can receive the voice command through a voice input unit such as a microphone.

According to an embodiment, the voice recognition unit 171 can transmit the received voice command to the internal STT server 13 to convert the voice command into a text data form. The voice recognition unit 171 can receive the voice command converted into the text data form from the internal STT server 13 and transmit the voice command to the control unit 170.

The control unit 170 of the display device 100 can transmit the voice command to the first external server 50 and the second external server 60 (S213, S215), and the first external server 50 and the second external server 60 can acquire the function corresponding to the voice command (S217, S227).

According to a second embodiment, the control unit 170 can transmit the voice command to all external servers capable of communicating with the display device 100.

According to an embodiment, the control unit 170 can directly transmit the voice command received through the voice input unit, such as the microphone, to the first external server 50 and the second external server 60. That is, the control unit 170 can transmit the voice command of the voice data form to the first external server 50 and the second external server 60. In this case, the first external server 50 and the second external server 60 can convert the voice command into text data through the STT servers provided therein, and the NLP server can analyze the converted text data and acquire the function corresponding to the voice command.

According to another embodiment, the control unit 170 can transmit the voice command converted into the text data form to the first external server 50 and the second external server 60. In this case, the first external server 50 and the second external server 60 can acquire the function corresponding to the voice command through the NLP servers provided therein.

According to another embodiment, the control unit 170 can transmit the voice command of the text data form and the voice command of the voice data form to the first external server 50 and the second external server 60. In this case, the first external server 50 and the second external server 60 can convert the voice command into the text data through the STT servers provided therein, and can compare the converted text data with the text data received from the display device 100. When the converted text data is different from the received text data, the STT servers of the first external server 50 and the second external server 60 re-analyzes the voice command, thereby improving the analysis accuracy of the voice command. Thereafter, the NLP servers of the first external server 50 and the second external server 60 can acquire the function corresponding to the voice command by analyzing the converted text data.

After the function corresponding to the voice command is acquired, the first external server 50 and the second external server 60 can acquire the provider providing the acquired function (S219, S229).

The first external server 50 and the second external server 60 can transmit information about the acquired function to the internal NLP server 15, and the internal NLP server 15 can determine the provider providing the acquired function through the determination module 10 provided therein. For example, the determination module 10 can determine that the provider providing the function is one of the display device 100, the first external server 50, and the second external server 60.

After the provider providing the function is determined, the internal NLP server 15 can transmit information about the determined provider providing the function to the first external server 50 and the second external server 60. As described above, the first external server 50 and the second external server 60 can acquire the provider providing the function, which corresponds to the voice command, through the determination module 10 provided in the internal NLP server 15.

Meanwhile, according to an embodiment, each of the NLP servers 55 and 65 provided in the first external server 50 and the second external server 60 can include the determination module 10. In this case, the first external server 50 and the second external server 60 can determine the provider providing the function.

The first external server 50 can determine whether the acquired provider providing the function is the first external server (S221). When the provider providing the function is the first external server, the first external server 50 can acquire data related to the function corresponding to the voice command (S223) and can transmit a function data signal corresponding to the voice command to the display device 100 (S225).

Meanwhile, when the provider providing the function is not the first external server, the first external server 50 cannot perform any operation. That is, the first external server 50 can terminate all operations related to the voice command received in operation S211.

However, according to another embodiment, when the provider providing the function is not the first external server, the first external server 50 can transmit, to the display device 100, a message indicating that the provider providing the function is not the first external server. In this case, the display device 100 can determine that the function corresponding to the voice command, which is received in operation S211, is not related to the first external server 50. Accordingly, the processing speed of the display device 100 can be improved. In addition, the display device 100 can determine that the provider providing the function corresponding to the voice command is the display device 100, based on the message received from the external server.

Similarly, the second external server 60 can determine whether the acquired provider providing the function is the second external server (S231). When the provider providing the function is the second external server, the second external server 60 can acquire data related to the function corresponding to the voice command (S233) and can transmit a function data signal corresponding to the voice command to the display device 100 (S235). Meanwhile, when the provider providing the function is not the second external server, the second external server 60 cannot perform any operation.

The control unit 170 of the display device 100 can determine whether the function data signal has been received (S237).

When the function data signal has been received, the control unit 170 can output the function corresponding to the voice command based on the data related to the function included in the function data signal (S241).

Meanwhile, when the function data signal has not been received, the control unit 170 can acquire data related to the function in the storage unit 140 (S239) and output the function corresponding to the voice command (S241).

A method of executing and outputting a function corresponding to a voice command will be described below with reference to FIGS. 12 to 19.

According to the second embodiment of the present invention, since the display device 100 does not include the determination module 10, there is an advantage that the size can be reduced and the manufacturing cost can be reduced. In particular, when the display device 100 includes the determination module 10, all the display devices 100 must include the determination module 10, but a smaller number of determination modules 10 are required than a case where the internal NLP server 15 includes the determination module 10, thereby reducing the manufacturing cost.

FIG. 9 is a control block diagram for describing a method by which a display device executes a function corresponding to a voice command upon reception of the voice command according to a third embodiment of the present invention, and FIG. 10 is a ladder diagram for describing a method by which a display device executes a function corresponding to a voice command upon reception of the voice command according to a third embodiment of the present invention.

FIG. 9 shows a main configuration of a display device 100 according to a third embodiment of the present invention. The display device 100 can include a voice recognition unit 171, a wireless communication unit 173, an output unit 186, and a control unit 170 and can further include a keyword determination unit 17. At this time, similar to that described with reference to FIG. 7, the determination module 10 can be provided in the internal NLP server 15.

A description about the same elements as those described with reference to FIG. 5 or 7 will be omitted.

A voice recognition unit 171 can receive a voice command through a voice input unit such as a voice microphone. At this time, the voice command received through the voice input unit can be a voice data form.

The voice recognition unit 171 can transmit the voice command of the voice data form to an internal STT server to convert the voice command into a text data form.

The keyword determination unit 17 can receive the voice command of the voice data form or the voice command of the text data form from the voice recognition unit 171.

The keyword determination unit 17 can recognize a preset keyword in the received voice command.

The control unit 170 can preset a keyword. At this time, the control unit 170 can set different keywords for each provider providing the function. The storage unit 140 can store keywords set differently for each of the display device 100 and the external server. In the examples of FIGS. 9 to 10, the control unit 170 can set different keywords to the first external server 50, the second external server 60, and the display device 100. The control unit 170 can set a first keyword corresponding to the first external server 50, a second keyword corresponding to the second external server 60, and a third keyword corresponding to the display device 100. For example, the first keyword can be "Hey", the second keyword can be "Execute", and the third keywords can be "Hi, TV", but the present invention is not limited thereto.

The control unit 170 can recognize a preset keyword in the voice command of the voice data form or the voice command of the text data form. When a specific keyword is recognized, data related to the function corresponding to the voice command can be received from the provider corresponding to the recognized keyword.

A method by which a display device executes a function corresponding to a voice command upon reception of the voice command, according to a third embodiment of the present invention, will be described with reference to FIG. 10.

The voice recognition unit 171 of the display device 100 can receive a voice command (S311).

The voice recognition unit 171 can receive the voice command through a voice input unit such as a microphone.

According to an embodiment, the voice recognition unit 171 can transmit the received voice command to the internal STT server 13 to convert the voice command into a text data form.

The control unit 170 can acquire the function corresponding to the voice command (S313).

The control unit 170 can convert the voice command into text data through the internal STT server 13 and control the voice recognition unit 171 to analyze the converted text data through the internal NLP server 15 and acquire the function corresponding to the voice command.

Meanwhile, the keyword determination unit 17 can recognize a preset keyword in the voice command (S315).

The voice recognition unit 171 can transmit the voice command of the voice data form or the voice command of the text data form to the keyword determination unit 17, and the keyword determination unit 17 can recognize the preset keyword in the transmitted voice command. That is, the keyword determination unit 17 can determine whether the voice data or the text data matching the preset keyword is present in the voice command.

The control unit 170 can determine the provider providing the function according to the recognized keyword (S317).

That is, the control unit 170 can determine whether the provider providing the function corresponding to the voice command is the first external server 50, the second external server 60, or the display device 100.

The control unit 170 can determine whether the provider providing the function corresponding to the voice command is the first external server (S319). When the control unit 170 determines that the provider providing the function is the first external server, the control unit 170 can transmit a data request signal to the first external server 50 (S321).

When the data request signal is received from the display device 100, the first external server 50 can acquire data related to the function corresponding to the voice command in response to the data request signal (S323), and can transmit the acquired data related to the function corresponding to the voice command to the display device 100 (S325).

Meanwhile, according to an embodiment, the display device 100 and the first external server 50 can confirm whether the provider providing the function in response to the data request signal is the first external server 50. Specifically, the first external server 50 can communicate with the internal NLP server 15, receive the determination result of the determination module 10 provided in the internal NLP server 15, and reconfirm the provider providing the function. That is, the first external server 50 can reconfirm the provider providing the function by comparing whether the provider providing the function, which is determined through the keyword determination unit 17, matches the provider providing the function, which is determined through the determination module 10. The first external server 50 can transmit the result of the reconfirmation to the display device 100, and only when it is reconfirmed that the provider providing the function is the first external server 50, the display device 100 can receive data related to the function corresponding to the voice command from the first external server 50 and execute the data.

Meanwhile, when the provider providing the function corresponding to the voice command is not the first external server, the control unit 170 can determine whether the provider providing the function is the second external server (S327). When the control unit 170 determines that the provider providing the function is the second external server, the control unit 170 can transmit a data request signal to the second external server 60 (S329).

When the data request signal is received from the display device 100, the second external server 60 can acquire data related to the function corresponding to the voice command in response to the data request signal (S331), and can transmit the acquired data related to the function corresponding to the voice command to the display device 100 (S333).

Similarly, according to an embodiment, the display device 100 and the second external server 60 can confirm whether the provider providing the function in response to the data request signal is the second external server 60. Specifically, the second external server 60 can communicate with the internal NLP server 15, receive the determination result of the determination module 10 provided in the internal NLP server 15, and reconfirm the provider providing the function. That is, the second external server 60 can reconfirm the provider providing the function by comparing whether the provider providing the function, which is determined through the keyword determination unit 17, matches the provider providing the function, which is determined through the determination module 10. The second external server 60 can transmit the result of the reconfirmation to the display device 100, and only when it is reconfirmed that the provider providing the function is the second external server 60, the display device 100 can receive data related to the function corresponding to the voice command from the second external server 60 and execute the data.

Meanwhile, when the provider providing the function corresponding to the voice command is not the external server, the control unit 170 can determine that the provider providing the function is the display device.

The control unit 170 can acquire data related to the function corresponding to the voice command in the storage unit (S335).

When the data related to the function corresponding to the voice command is acquired in operation S325, S333, or S335, the control unit 170 can output the function corresponding to the voice command (S337).

The control unit 170 can execute the function corresponding to the voice command through the received data related to the function and output the function through at least one of the display unit 180 and the audio output unit 185.

A method of executing and outputting a function corresponding to a voice command will be described below with reference to FIGS. 12 to 19.

According to the third embodiment of the present invention, since the provider providing the function corresponding to the voice command can be determined through the keyword and the display device 100 need not include the determination module 10, there is an advantage that the size can be reduced and the manufacturing cost can be reduced. In addition, since the information about the voice command is not transmitted to the entire external servers through the keyword recognition result, the traffic reduction effect is obtained.

Next, a method by which a display device 100 receives a voice command and outputs a function corresponding to the received voice command will be described with reference to FIGS. 11 to 19.

FIG. 11 is a diagram illustrating an output of an output unit when a display device receives a voice command, according to an embodiment of the present invention, FIGS. 12 to 14 are diagrams illustrating outputs of an output unit when a provider providing a function corresponding to a voice command is a display device, according to an embodiment of the present invention, FIGS. 15 to 17 are diagrams illustrating outputs of an output unit when a provider providing a function corresponding to a voice command is a first external server, according to an embodiment of the present invention, and FIGS. 18 and 19 are diagrams illustrating outputs of an output unit when a provider providing a function corresponding to a voice command is a second external server, according to an embodiment of the present invention.

As shown in FIG. 11, the control unit 170 the control unit 170 can control the display unit 180 to display a voice recognition indicator 1100 while the voice recognition unit 171 receives a voice command.

The display unit 180 can display the voice recognition indicator 1100 in a standby state for receiving the voice command and a state of receiving the voice command.

The voice recognition indicator 1100 can include a message indicating that the voice command is being recognized. For example, the voice recognition indicator 1100 can include a message like "Say now".

A user 1 can input a voice through a voice input unit, such as a microphone, provided in a remote control device 200. Alternatively, the user 1 can input a voice through a voice input unit provided in the display device 100.

The voice recognition unit 171 can receive a voice command by recognizing a voice of a user while the voice recognition indicator 1100 is displayed.

When the voice command is received, the control unit 170 can determine a function corresponding to the voice command and a provider providing the function, receive data related to the function corresponding to the voice command from the determined provider, and execute the function.

FIGS. 12 to 14 are diagrams illustrating the outputs in a case where the provider providing the function corresponding to the voice command is the display device. The display device 100 can provide a function of displaying a related image list 1200 associated with a currently displayed image as shown in FIG. 12, a gallery mode function of outputting a portrait, a landscape, and the like so as to serve a frame when power is turned off as shown in FIG. 13, and a function of displaying a screen mode description menu 1300 so as to change a screen mode as shown in FIG. 14. In addition, the display device 100 can provide a channel change function, a volume change function, a content search function, an application execution function installed inside, and the like, but the present invention is not limited thereto.

FIGS. 15 to 17 are diagrams illustrating the outputs when the provider providing the function corresponding to the voice command is the first external server 50. The first external server 50 can provide a function of displaying person information 1500 as shown in FIG. 15, a function of providing stock information 1600 as shown in FIG. 16, a function of providing sports information 1700 as shown in FIG. 17, and the like. The first external server 50 can be a server corresponding to a provider such as a portal site company, and the first external server 50 can provide various functions such as an order function and a data storage function, but the present invention is not limited thereto.

FIGS. 19 and 20 are diagrams illustrating the outputs when the function is executed in a case where the provider providing the function corresponding to the voice command is the second external server 60. The second external server 60 can provide a shopping function of outputting a shopping screen 1800 including product information and a purchase icon as shown in FIG. 18, and an IoT function of displaying an electronic device screen 1900 connected to the display device 100 as shown in FIG. 20. In addition, the second external server 60 can provide various functions, but the present invention is not limited thereto.

As such, the function executed through the voice command and the provider providing the function are various. Therefore, when the voice command simply including function information is received, it may be difficult for the display device 100 to acquire data related to the corresponding function. The display device 100 according to at least one embodiment of the present invention can determine the corresponding function and the provider providing the corresponding function even when the voice command simply including only function information is received, thereby more quickly and accurately executing the function corresponding to the voice command.

FIGS. 5 and 6, FIGS. 7 and 8, and FIGS. 9 and 10 have been separately described as the first embodiment, the second embodiment, and the third embodiment, but this is for the sake of convenience of description, the respective embodiments can be implemented in combination. According to an embodiment, the above-described method can also be embodied as processor-readable codes on a program-recorded medium. Examples of the processor-readable recording medium include read-only memory (ROM), random-access memory (RAM), CD-ROMs, magnetic tapes, floppy disks, and optical data storage devices.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a wireless transceiver configured to communicate with at least one of a plurality of external servers;
a storage;
a microphone configured to receive a voice command; and
a processor configured to:
recognize a preset keyword in the received voice command,
determine a provider providing a function corresponding to the voice command based on the recognized keyword among the plurality of external servers,
receive a result of comparing whether the determined provider matches a second provider determined through a determiner of a natural language processing (NLP) server,
receive data related to the function from the determined provider among the plurality of external servers only when the determined provider matches the second provider,
execute the function corresponding to the voice command, and output the function corresponding to the voice command.

2. The display device according to claim 1, wherein the storage stores keywords set differently for each of the display device and the at least one of the plurality of external servers.

3. The display device according to claim 1, wherein the provider among the plurality of external servers is a server that communicates with the determiner of the NLP server that determines the second provider providing the function corresponding to the voice command.

4. The display device according to claim 1, wherein the processor is further configured to:
if the determined provider is an external server of the plurality of external servers, transmit a data request signal to the external server corresponding to the determined provider.

5. A method for operating a display device, the method comprising:
receiving a voice command;
recognizing a preset keyword set according to a different keyword for each of the display device and a plurality of external servers in the received voice command;
determining a provider providing a function corresponding to the voice command among the plurality of external servers based on the recognized keyword;
receiving a result of comparing whether the determined provider matches a second provider determined through a determination module of a natural language processing (NLP) server:
receiving data related to the function from the determined provider among the plurality of external servers only when the determined provider matches the second provider; and
executing the function corresponding to the voice command.

* * * * *